Nov. 6, 1928.

G. ACKERMANN

SAFETY VALVE

Filed March 26, 1921     3 Sheets-Sheet 1

1,690,097

Inventor:
Gottlieb Ackermann

Patented Nov. 6, 1928.

1,690,097

UNITED STATES PATENT OFFICE.

GOTTLIEB ACKERMANN, OF ESSLINGEN, GERMANY, ASSIGNOR TO THE FIRM: BRANN & WOLFF, OF BERLIN, GERMANY.

SAFETY VALVE.

Application filed March 26, 1921, Serial No. 456,040, and in Germany February 13, 1918.

My invention relates to safety valves and more especially to valves adapted to safeguard steam or gas chests against the destructive action of a too high internal pressure on the part of the medium contained therein. More particularly, my invention refers to what are known as safety valves with a high lift, i. e. valves of the kind specified in which the steam or gas is forced, after the valve has been unseated, by any suitable means to raise the valve body considerably higher than it would if no such special measure had been adopted.

With the view to successfully solving the problem thus created, it was hitherto proposed to make use of additional surfaces, diversely arranged, which were disposed above the valve seat face. After the valve had been lifted from its seat, these said additional surfaces would then come to act as enlarged valve surfaces and would thus cause the steam to drive the valve body considerably further upward than actually corresponded to the degree of pressure exerted by the steam upon the valve surface lying immediately above the steam exhaust port. In the majority of cases, there is at the same time provided a surrounding valve cage, as also baffle and guide surfaces close to the valve seat, or similar means for preventing the steam from blowing off freely. Instead of escaping directly into the atmosphere the steam was thus compelled to closely approach the valve body and to spend its energy.

All these arrangements involve the drawback of requiring special measures and auxiliary means in order to cause the valve, once it has been opened, to safely close again. Besides, inasmuch as the valve must close again, the extent to which the valve may be lifted will be but small. If the valve be so regulated as to enable it to effect a higher lift, its closure will either be rendered doubtful, or else will only take place after the pressure within the steam chest has dropped considerably below the back pressure (normal pressure) of the weight or spring load on the valve, so that the increased blowing off will cause material losses.

In contradistinction thereto my invention allows the valve to be raised to any predetermined height of lift, while at the same time insuring a quick and reliable closure as soon as the desired drop of pressure has been attained. This is obtained by disposing around the valve seat a guide surface and at the same time so dimensioning the steam outlet which is formed when the valve is raised from its seat that regardless of the height to which the valve has been lifted, always so much, or better, only so much steam can escape that the pressure in excess of the back pressure of the valve—that is to say, the difference between the steam pressure and the external load pressing against the valve including the net weight of the valve body itself—will be the same regardless of the height to which the valve body has been raised. To this end, the inner wall of the body on which the guide surface is arranged, must surround up to the maximum height of lift, the valve body or at the least that part thereof which moves in reach of the said guide surface and projects farthest. The guide surface may be cylindrical, prismatic or cup-shaped.

This novel arrangement forces the valve, each time it is lifted, to rise directly to the full, predetermined height, because the lifting power is the same at every intermediate stage. The valve body now remains in its lifted position until the excess of pressure of the escaping steam has dropped so far that it no longer suffices to overcome the back pressure exerted by the external load pressing on the valve. If the steam lacks the power to retain the valve in any one position then, owing to the peculiar arrangement according to my invention, it also lacks the power for all other positions. The valve body therefore drops directly down onto its seat, exactly as it had risen when opening, without coming to a stop at any intermediate stage. The customary enlargement of the valve surface opposed to the escaping steam, beyond the cross sectional area of the exhaust port of the boiler, need merely take into account the increased spring tension brought into play when the valve lift attains its maximum. Hence, in the case of a weight loaded valve, additional surfaces may be dispensed with altogether. Whenever it is desired to adjust the valve to various boiler pressures, this may be effected either by altering the external load brought to bear on the valve, or else by altering the active valve surface, or finally, as will be set forth hereinafter, by causing a steam pressure to assist the external load acting on the valve from above.

For the purpose of lessening the disagreeable noise caused by the extraordinarily large quantity of steam flowing out by reason of the high lift of the valve, it will generally be necessary to provide silencers of some sort.

The improved valve is adapted for such small drops of pressure as have hitherto not been deemed attainable. It is true that in such cases special means have to be provided, yet they will not by far be so cumbrous as the means required with the customary type of valves for considerably greater drops of pressure to avoid jerking, that is an opening and shutting of the valve in rapid succession.

In the drawings affixed to this specification and forming part thereof, several modifications of a valve embodying my invention are illustrated by way of example. In the drawings

In the first five figures of the above drawings, like reference characters denote like parts.

Figure 1:
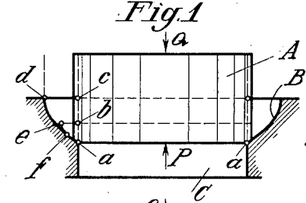
Fig. 1 is a diagrammatic view illustrating the determination of an internally cup-shaped guide body.

Referring to Fig. 1 of the drawings, A is the valve body to be raised by the steam, B the guide body, suitably hollowed in accordance with my invention to the shape of a cup, C the steam exhaust port of the chest which, under normal conditions is kept shut by the valve body A. It is now intended that this said valve body shall be lifted the distance $a-c$ from its position of rest $a-a$ by the steam pressure P counter to the pressure exerted by the load Q lasting on the valve. In order that the fundamental condition of a like excess of pressure in every height of lift, i. e. along the whole predetermined path of the valve body in accordance with the formula: $(P-Q) = $ constant be fulfilled, the cavity of the guide body B is so dimensioned that on the steam being allowed to escape without shock there will be left in the annular clearance intermediate the farthest projecting edge of the valve A, and the wall of the guide body, exactly so much area of passage for the steam as is cleared when raising the valve through the cylindrical gap directly above the valve seat, between the closed and open position of the valve which equals the magnitude of "lift × valve circumference". For this reason, to every section $a-b$ of the lift there must correspond a point $f$ of the wall of the cavity of the guide body which point is equally distant from point $b$ and from point $a$, and the curvature of the cavity will preferably, as shown in the drawing, be similar to a parabola the vertex of which is located at the point $d$ at which the curve of the cavity intersects with the horizontal plane at the maximum lift position $c$, so that the tangent to the curvature of the guide body in the point $d$ will be vertical and will extend in parallel to the direction of lift.

Herewith the method of establishing the connection required in accordance with my invention between the configuration of the valve body and that of the cavity of the guide body has been explained in principle. Now a valve constructed on these lines would indeed rise under the impulse of an excessive steam pressure, and in full accordance with the statement made in the introduction to this specification, directly to its maximum height of lift. However, the moment a normal pressure were re-established in the steam chest, it would at once close again. Having regard, however, to the fact that after the steam has escaped the valve will remain closed only after the normal pressure has been kept up for a certain length of time, should there be an immediate increase in steam pressure the valve will almost always be compelled to re-open immediately after closing in order to allow still more steam to escape which may cause the valve to jerk. In other words, it is desirable that the valve be kept from closing due to any momentary decrease in pressure followed at once by an increase thereof.

Figure 2:
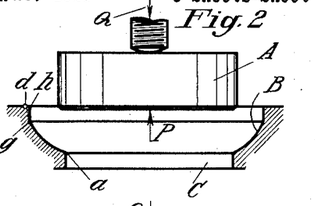
Fig. 2 is a similar view showing how by altering the curvature of the guide surface, the time during which the valve is to be kept open may be prolonged.

This defect is remedied by the arrangement disclosed in Fig. 2, which, by a contraction of the exhause port toward the end of the lift, provides for a greater throttling of the steam than originally devised, the curvature of the interior of the guide body— which in accordance with the invention runs from $a$ to $g$—passing over at $g$ into a cylindrical surface. Hence, the section of the guide body cavity remains unvaried from this point $g$ up to the maximum height of lift, and as a result the additional lift pressure will increase from the point $g$ right up to the point $h$, so that the valve will not, as in the case of the curvature of the cavity along the curve $a$—$g$—$d$, be brought to a stop within the horizontal plane at $d$, but must be caused to be brought to a stop at the point $c$ by an abutment formed by a threaded bolt as in Fig. 2. For the purpose of shutting the valve there is now required a bigger drop of pressure in the boiler than in the case of the arrangement according to Fig. 1; hence the valve will remain open for a greater length of time. By a suitable contraction and a correspondingly suitable dimensioning of the section $g$—$h$, the arrangement may be so devised as to obviate the possibility of any premature shutting down of the valve with all its attending drawbacks, without, however, in any way impairing the effect destined to be achieved subject to the leading feature of my invention. The longer the section $g$—$h$ is made, the longer will the valve remain open.

Figure 3:
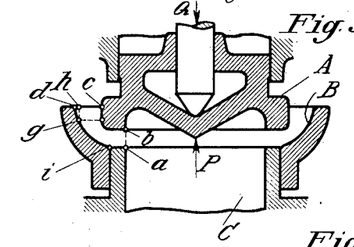
Fig. 3 is a vertical section illustrating the reduction to practice of the theories illustrated in Figs. 1 and 2.

Practical considerations, however, further require that due regard be paid to alterations in the temperature and volume of the steam flow blowing off, as also to the peculiar configuration of the valve body A. For this latter, when the valve is opened will invariably bring about an increase of the effective valve lift surface dependent upon the amount of the valve seat and valve packing surface, as clearly shown in Fig. 3. The lift action of these said additional valve lift surfaces is neutralized by a suitable enlargement of the steam exhaust areas. According to Fig. 3 the unavoidable addition of these said surfaces is duly taken into account by the point of extension of the cavity of the guide body; curved in accordance with my invention, being shifted outward for the width $a$—$i$ of the valve seat face. All the rest has already been explained by what has been previously stated with regard to Figs. 1 and 2, in particular as concerns the expediency, or better, the necessity of substituting for the upper end section $g$—$d$ of the curvature of the guide body a contraction $g$—$h$. Any other modifications that may still be necessary may be carried out as a rule by a slight subsequent scraping of the cavity of the guide body when testing the valve without requiring any other special operations.

Figure 4:
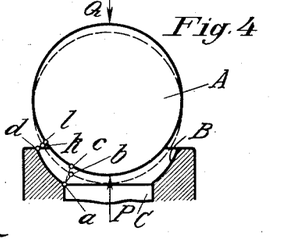
Fig. 4 is a diagrammatic view showing the application of the invention to ball valves and at the same time illustrating the possibility of suitably curving the surface of the valve body instead of the inside face of the guide body, and moreover the application of approximation circles in the one as well as the other case.

Fig. 4 illustrates the application of my invention to ball valves. This arrangement is specially suited for very small valves having only a slight lift. The valve body A is shown (in dash lines) as located in an intermediary position and (in full lines) when located in the position corresponding to maximum lift. The opening $d$—$k$ at the upper edge of the guide element B corresponds to a lift from $a$ to $b$, while the opening $d$—$l$ corresponds to a lift from $a$ to $c$.

The diagram according to Fig. 4 moreover discloses a number of important features. For one thing it proves that the cavity of the guide body may be so selected that its curvature, instead of forming a parabola may be replaced by an approximation circle. Secondly, it is clearly shown that when selecting any form of cavity whatsoever for the guide body, say, for example, that of a cup of any radius whatsoever, the steam exhaust port required by the invention may just as easily be produced by a suitable curvature of the effective surface of the valve. As a result, the curve representing the curvature of the valve body may likewise be replaced by an approximation circle, so that in consequence the valve body may be made as a ball or sphere of a definite diameter. In the end, the curvature required may be allotted to both parts, namely, to both the cavity of the guide body and to the effective valve surface, and, if need be, the curvatures of both parts may be replaced by approximation circles.

Figures 5, 6, 7, 8, 9:
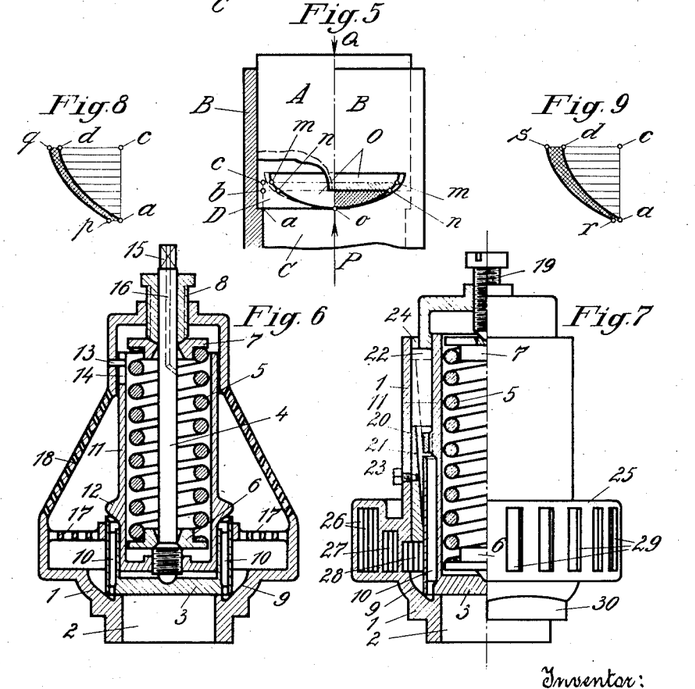
Fig. 5 illustrates the adaptability of hollow cylindrical or prismatic guide elements.
Fig. 6 is a vertical section of a spring-loaded valve having an internally cup-shaped guide body and a valve body with an adjustable steam exhaust port. In addition this valve construction is provided with a cage, the walls of which are perforated for silencing purposes.
Fig. 7 is an elevation (at the right) and a vertical section (at the left) of a modified form of a spring-loaded valve. More particularly, there is here disclosed an arrangement by means of which the exhaust port above the valve is adapted to compensate for the increment in the spring tension as the valve is raised, and this regardless of the height to which the valve is lifted.
Fig. 8 is a diagrammatic view of the cross-sectional area of the value opening at every height of lift, whenever the valve body according to Fig. 6 is lifted.
Fig. 9 is a similar view, illustrating the alteration of the width of outlet along the path of opening when a valve as illustrated in Fig. 7 is lifted, the valve resistance steadily varying along the path of opening.

A final form of carrying into effect the principle of my invention is disclosed in Fig. 5. Here the steam exhaust required in accordance with my invention is not achieved either by the shape given to the cavity of the guide body B nor by any curving of the surface of the valve body A, but rather by openings cut into the wall of the guide body B which, when the valve is raised from its seat, are adapted to open outlet areas that will allow of a passing off of the steam in the sense corresponding to the invention. In this arrangement the valve body A is preferably enclosed substantially steam-tight by the guide body B. To this end, the cavity of the guide body may be either cylindrical or prism-shaped; in which case the valve body will obtain a form to correspond, or it may be spherically shaped, as circumstances may suggest.

In the construction as shown, the two openings O are intended to fulfill the requirements laid down by the invention. The valve body A is shown as raised for the distance a—b above its position of rest a. To the right of the center line P—Q the exhaust port opened in consequence is indicated by cross hatching. To the left of the center line, the lower part of the valve body is broken away to disclose the second opening O arranged to the rear of the guide body B. The total exhaust port cleared when the valve is lifted to the point b, is twice the size of the surface o—n, n—o. When the valve is lifted to the point c, the said exhaust port is supplemented by the plainly hatched part, so that now in all twice the surface o—m, m—o will come to be cleared or opened. The openings increase from point o onward, (which corresponds to the closing position a of the valve) toward both sides after the manner of the segment of a circle, suitably contracting at the upper end again as set forth with respect to the construction shown in Fig. 2. The space D within the guide body B below the valve body and which comes to be opened when the valve is raised, merely serves as a throttling chamber.

I will now pass on to the modified forms of construction disclosed in Figs. 6 and 7, which for their part, too embody a number of essential details of manifest importance in enhancing the utility of the valves constructed in accordance with my invention.

In Fig. 6, 1 is the valve box, 2 the exhaust port of the steam chest kept shut by the valve body 3. The valve is loaded by a pin 4, for its part subject to the action of a spring 5 tensioned between two supporting plates 6 and 7. The tensioning of the spring is adjustable by means of a threaded sleeve 8 inserted in the box or casing 1, the bore drilled into said sleeve serving as a collar bearing for the pin 4. The special requirements imposed by my invention are here complied with by the configuration given to the hollow surface 9.

One of the particular features of the construction disclosed in Fig. 6 is the provision of conduits or passages 10 within the valve body 3. They may be closed up to a greater or less extent, by adjusting the projections 12 (either forming part of a collar or constituting separate elements) the said adjustment being effected from without. Hence, the conduits or passages 10 may be regulated as required even during service, and this by the sleeve 11 with its female thread being mounted on the thickened, lower threaded end of pin 4. A projection 13 fixed to the valve cage and adapted to engage a slot 14 formed in the sleeve 11, serves to prevent a sidewise displacement of said sleeve without, however, forming an impediment to an endwise displacement of said sleeve which in this case constitutes the wall of the spring box. As a result, by turning the square headed upper end 15 of the valve pin 4 there is brought about an up and down motion of sleeve 11 and therewith of the projections 12, resulting in the opening and shutting, respectively, of the conduits 10. Now this said opening and shutting operation corresponds to a change in the valve resistance, which again is tantamount to the capacity to control the duration of the working period. When the conduits 10 are completely closed, the lift action of the steam is at its greatest: the valve now operates at the maximum period of opening. On the conduits 10 being opened, the valve resistance is reduced, and therewith also the duration of the working period: the valve shuts down more rapidly, which again is tantamount to an adjustment to a different normal pressure. To sum up, it will be seen that the valve may be adjusted by an adjustment of the projections 12, so as to enable it to function in response to different degrees of boiler pressure—hence, different degree of "normal pressure"—as also, in the case of an unvaried normal pressure, for a larger or smaller period of opening and therefore for a greater or smaller reduction of pressure.

By the arrangement just described it has been made perfectly clear—to sum it up again concisely—that in the case of valves of this improved type by employing valve bodies having exhaust passages the area of which may be varied or rather in which different resistances may be opposed according to requirement to the steam as it blows off, an adjustment during service may be effected by means of which both the duration of the working period, i. e. the blowing off period, may be varied as also the normal pressure, i. e. the boiler pressure, any excess of which the valve is intended to prevent. For the purpose of adjusting the parts shiftably disposed to this very end, use may preferably be made of a valve pin adapted to transfer the external load on the valve on to the valve body. To enable this to be accomplished, the said pin must be connected in some way or other with its internal end to the valve body. A positively closing connection will here be found to be perfectly adequate. Where the valve is spring-loaded, the impulse derived from the action of the load spring will serve to establish this positive connection. In such a contingency, a displacement of the shiftable parts may be effected by the provision of a thread on the valve pin, on which thread the shiftable parts may be screwed and the arrangement of an axially disposed slot in the shiftable element which a guide fixed to the valve casing is adapted to engage. As a result, on the valve pin being turned, the shiftable element will (without rotating itself) glide along the guide and either rise or descend in consequence. All these results may be achieved by mechanical means of the most divers kind. Fig. 6 shows how, when the valve is spring-loaded, the spring box may be made to serve as the sliding member for the particular object just specified. The throttling part—i. e. projections 12 are here fixed to the spring box and are therefore entrained in its motion.

The accuracy of these adjustments may be promoted by the provision of an additional back pressure above the valve body, adapted to aid the external load on the valve in its endeavor to keep the valve shut. Such a back pressure may be secured in the case of the improved valves in a very simple manner by the valve being made cup-shaped, the sides of the cup telescoping (so as to render the parts substantially steam-tight) with the correspondingly formed parts of the valve box. By means of slight "leaks" or very narrow passages or apertures, the steam is enabled when the valve is raised from its seat to penetrate into the cylinder space thus formed. If, as a result of the rapid blowing off of the steam due to the large opening lift, the boiler pressure happens to be reduced, then the expansion of the steam which has entered the cylinder space will cause the additional pressure to be produced which will effect the shutting down of the valve as required. By means of additional "leaks" arranged at upper points of the cylinder space the steam which has entered is gradually led off again into the atmosphere.

In Fig. 6 the arrangement above specified is achieved by the sleeve 11 forming a sort of cup-shaped top of the valve body 3 adapted to telescope with the upper part of the valve box 1 in a steam-tight manner. Now owing to the powerful throttling action which the steam flowing past the valve body 3 is subjected to within the valve box by the perforated plates 17 and 18 provided primarily for silencing purposes, a considerable portion of what is still high-pressure steam is forced through the leaks existing between the valve cage 3 and sleeve 11 or else between this latter and the pin 4 into the interior of sleeve 11 serving as a spring box. A narrow passage 16 provided at the upper end of pin 4 serves as a means for letting the steam which has entered, pass out again into the atmosphere.

In the form of construction disclosed in Fig. 7, parts 1 to 7 are the same and possess practically the same shape as in Fig. 6. On the other hand, pin 4 is omitted, the spring 5 being freely inserted intermediate plates 6 and 7. In the place of the threaded sleeve 8, there is arranged a set screw 19 for the purpose of tensioning the spring. The capacity of the construction to act in accordance with the main feature of my invention is again secured by the provision of a hollow surface 9. There are also provided exhaust passages 10 within the valve body. What is primarily novel in this modified form of construction is that the spring box, while being again adapted to telescope with the upper part of the valve cage, for the rest forms a cup-shaped top rigidly connected with the valve body 3, and that the exhaust passages 10 do not terminate in the casing serving as a silencer, but in a space 22 in which there is arranged an adjusting collar 20 for the purpose of regulating the area of the exhaust passages 10, and a conical sleeve 21. The space 22 is formed by the spring box 11 and the central part of the valve cage 1, which latter is pierced only with a very short passage 24 for the purpose of establishing communication with the outside. The conical sleeve 21 may be adjusted from the full to dotted line positions as shown in Fig. 7 and secured by means of the screw 23. The main substance of this arrangement, which is chiefly destined for spring-loaded valves, resides in the provision of the spaces 22 above the outlets of the passages 10. These said spaces serve the purpose of leading off into the atmosphere, and this separately from the rest of the steam blowing off, that particular flow of steam which passes out through the passages 10. By this means the possibility is afforded of causing this latter flow of steam of encountering within the spaces above the valve body a different resistance to flow for every height of lift assumed by the valve. To this end, and amongst others, it will be found very practicable to arrange the wall surfaces of these spaces extending in the lift direction, in such a manner that they will come to lie at an incline relatively to each other. Or, if preferred, auxiliary means of any kind whatsoever may be introduced into the said spaces adapted to alter in the same or a like way the resistance to the flow. An auxiliary means of very simple construction will be found to consist in the conical sleeve 21 before-described which is shiftable and yet capable of being fixed in its position within the hollow cylindrical chamber 22. And by reason of the fact that, for every height of lift assumed by the valve, despite the parts being rigidly fixed into the position into which they have been once adjusted, there is thus secured a different degree of valve resistance, the possibility is afforded of so regulating the reciprocal action of the parts that any alteration of the valve resistance at every height of lift will accurately correspond to an alteration of the spring tension for this particular height of lift. The complementary back pressure within the spring box 11 may be produced and utilized in this case in the same manner as in the construction according to Fig. 6. For the purpose of silencing the noise caused by the blowing off of the steam there are provided within a radially expanding, cylinder or drum-shaped part 25 three expansion chambers radially disposed in series and increasing stepwise toward the exterior, and fitted with baffle walls 26, 27, 28 displaced relatively to each other in the peripheral sense. After having passed these walls the steam flows through the apertures 29 into the outside. At 30 there is arranged a hexagonal surface for screwing the valve on to the exhaust connecting branch.

Figs. 8 and 9 illustrate in a diagrammatic manner the effect achieved by means of the arrangements according to Figs. 6 and 7 with relation to the exhaust areas which are open at every height of lift. As disclosed in Fig. 8, owing to the presence of the passages 10 in the case of the construction shown in Fig. 6, the exhaust areas released in the course of a lift extending for the distance a—c by the curvature a—d of the guide body face 9, will be supplemented at every height of lift by the values of the openings 10—variable in and for themselves but constant for the entire lift once they have been adjusted. Hence, the total opening area will correspond to a curve p—q, running in substantial parallel to the curve a—d, so that a—p=q—d. However in the case of Fig. 7, the opening area—increased by the apertures 10—varies from one height of lift to the other, so that the curve r—s will by no means run in substantial parallel to curve a—d. On the contrary, the section s—d, in this case, is bigger than r—a. This difference is prominently disclosed by the cross hatchings in both Figs. 8 and 9.

The arrangement of a back pressure chamber above the valve body while at the same time causing the cup-shaped valve body to engage in a manner so as to render the whole perfectly steam tight, a suitably shaped hollow portion of the valve chest which, when the valve is spring-loaded, simultaneously forms the spring box, and all this, as set forth herein before in connection with the constructions according to Figs. 6 and 7, for the purpose of providing means for accurately regulating the duration of the working period, involves for this novel type of high lift valves the manifest advantage of rendering available to the fullest extent the peculiar properties of these improved valves, the same being only afforded by this very arrangement. Chief among these peculiar properties may be reckoned, on the one hand, the high lift of these valves, which is at once attained to its full, predetermined height, and, on the other hand, the dispensing with any enlargement of the effective valve face over and beyond the cross-sectional area of the exhaust port of the steam chest which it is adapted to close, in- asfar as the provision of such an enlargement cannot be avoided by the shape of the valve body or—where the valve is spring-loaded—is deemed necessary for balancing the increasing spring tension as the valve is being unseated. Both features combined, however, result in an extremely easy opening and shutting motion, hence, an extremely high sensitivity on the part of the improved valves. As a matter of fact, these novel valves are enabled to operate with differences of pressure of as little as $\frac{1}{10}$ atm. and even less, whereas the best valves hitherto put on the market, and therefore the ones most used, call for differences of pressure of from 1 atm. to $\frac{1}{10}$ atm. in order to re-seat the valves, and this in spite of rather complicated auxiliary means being employed. Not withstanding, there is the danger of the improved valves when adjusted to respond to extremely small differences of pressure becoming hypersensitive and, by opening and shutting down too rapidly in succession, beginning to hammer. Here then would be a case where by reason of their excellent properties, namely, of opening at full lift and always shutting down again reliably, the improved valves would prove fatal, for both in the course of the upward motion as also in the course of the downward motion the valve body will come to strike violently against the stationary parts, so that the valve seat is apt to be quickly destroyed by the violent action resulting.

The hereinbefore-described device is intended when suitably utilized to actively remedy this defect, the steam entering through the first "leak" above the valve body acting as a braking means when the valve is unseated and by the steam, on the other hand, as a result of the supplementary force produced by its expansion serving to temporarily retard the re-opening action, until it i. e. the steam has gradually passed through the second "leak" again out of the buffer chamber into the outside. With due regard to the effect thus secured, the second "leak" (compare the description of the construction shown in Fig. 6) will therefore, and this preferably, afford a smaller passage area for the steam than the first "leak", and one of the two leaks, (preferably the second) will suitably be made to be capable of regulation in order to be able to control the force of the effect within certain limits. A reliable manner of predetermining the relative proportions of the two leaks will, in view of the numerous chances upon which the proper selection of this proportion depends, prove impossible. On the other hand, tests have shown that the regulation of this effect as indicated may be successfully carried through separately for each case. As a suitable means to this end, use may be made of needle valves, amongst others, which may be directly arranged at the buffer chamber or also at the end of a thin tube running to the engine driver's stand. If preferred, the needle valves or the like arranged at the buffer chamber may be controlled from the engine driver's stand by electromagnetic means. In the forms of construction of the improved valves presently to be described with reference to Figs. 10 and 11, there are provided for the object specified, the needle valves 52 and 89, respectively.

Figure 10:
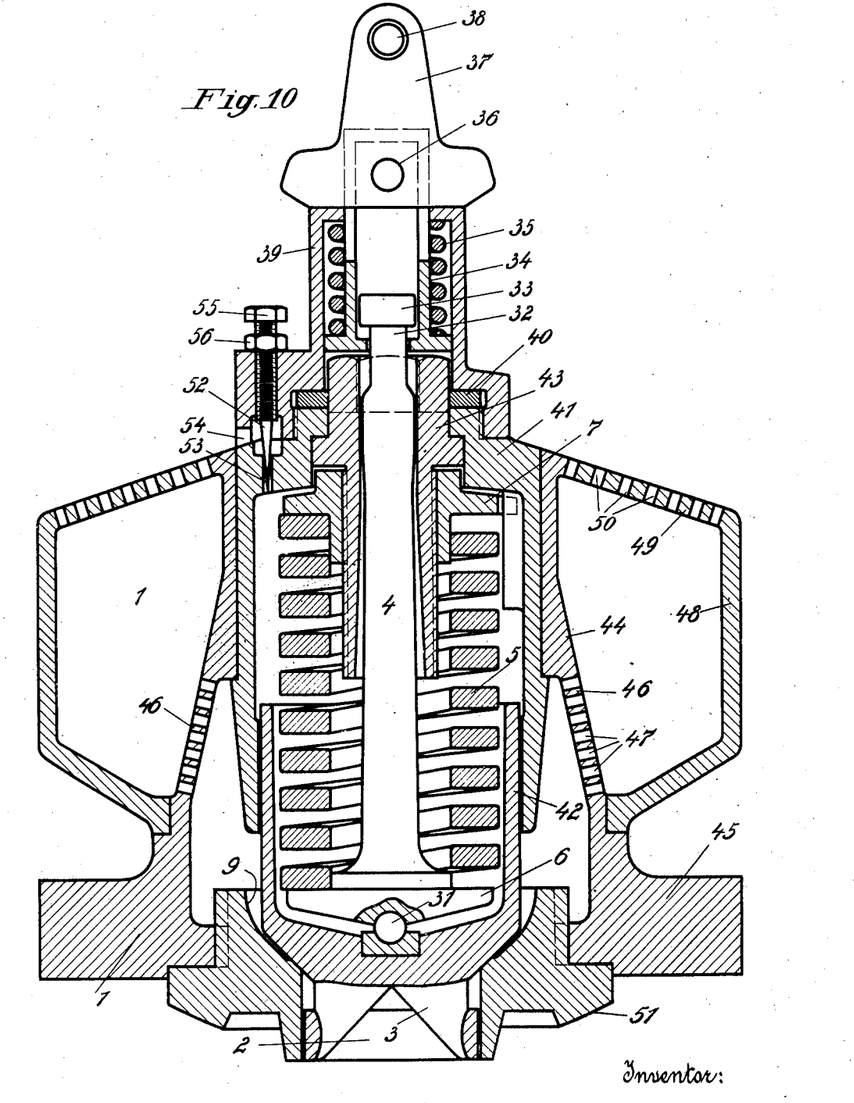
Fig. 10 is a vertical section on an enlarged scale of a particularly useful construction comprising means for regulating the back pressure by aid of a needle valve.

Fig. 10 discloses a form of construction which has proved to be particularly satisfactory in practical working. The valve casing 1 comprises a plurality of parts. The valve body 3 has a cup-shaped form and is provided with downwardly projecting guide blades. 2 is the steam inlet port. The pin 4 is made integral with the lower support 6 for the flat plate spring 5, while 7 is the upper abutment for the said spring, and 9 the guide face, suitably cup-shaped in accordance with my invention and surrounding the valve body 3. Between the valve body 3 and the pin 4 there is inserted a steel ball 31. At its upper end, the valve pin 4 is provided with a neck 32 of smaller cross section above which there is arranged a collar 33. By aid of these parts, the valve pin projects intermediate the arm of a strap 34 on which there is mounted a spring 35 and which is suspended by a bolt 36 from an intermediary member 37, adapted to be connected by a bolt 38 to a rod system operated from the engine driver's stand. The box 39 of the spring 35 is screwed with the interpolation of a packing 40 on to a part 41, adapted to enclose the lower portion of the cup-shaped top 42 of the valve body 3 after the manner of a guide, while embracing at the top the combination collar and sliding bearing of pin 4, for its part shaped to form a hollow threaded bolt. On the threaded section of bolt 43 there is mounted a nut 7, secured by a projection and abutment against sidewise displacement and forming the upper abutment of spring 5. By manipulation of the upper hexagonally shaped end of part 43, which projects beyond the packing 40, the spring 5 may be tensioned whenever required, without taking apart the entire valve casing, by merely lifting off the cap 39. The cup-shaped valve and part 41 form the buffer chamber above alluded to and, at the same time, the protective casing for the spring 5. Part 44 is mounted on part 41 together with the flanges 45, (serving to attach the entire valve to the steam chest) and the wall surfaces 46 comprising the exhaust apertures 47; while on part 44 there is arranged the cap 48, the roof or coping 49 of which is pierced by apertures 50. To the flanged part 45 there is screwed the annular seat 51 of the valve. A slight clearance intermediate part 42 and the cylindrical bore of part 41 acts as the "leak" for the admission of the steam into the buffer chamber formed by these said parts. The second "leak" serving as the exhaust passage for the steam which has entered and for regulating the excess pressure within the buffer chamber is formed by the aperture 53 which is more or less contracted by the needle valve 52 and through which the steam may pass to the outlet port 54. A set screw 55 and lock nut 56 serve as means to adjust the needle valve as may be required.

Figure 11:
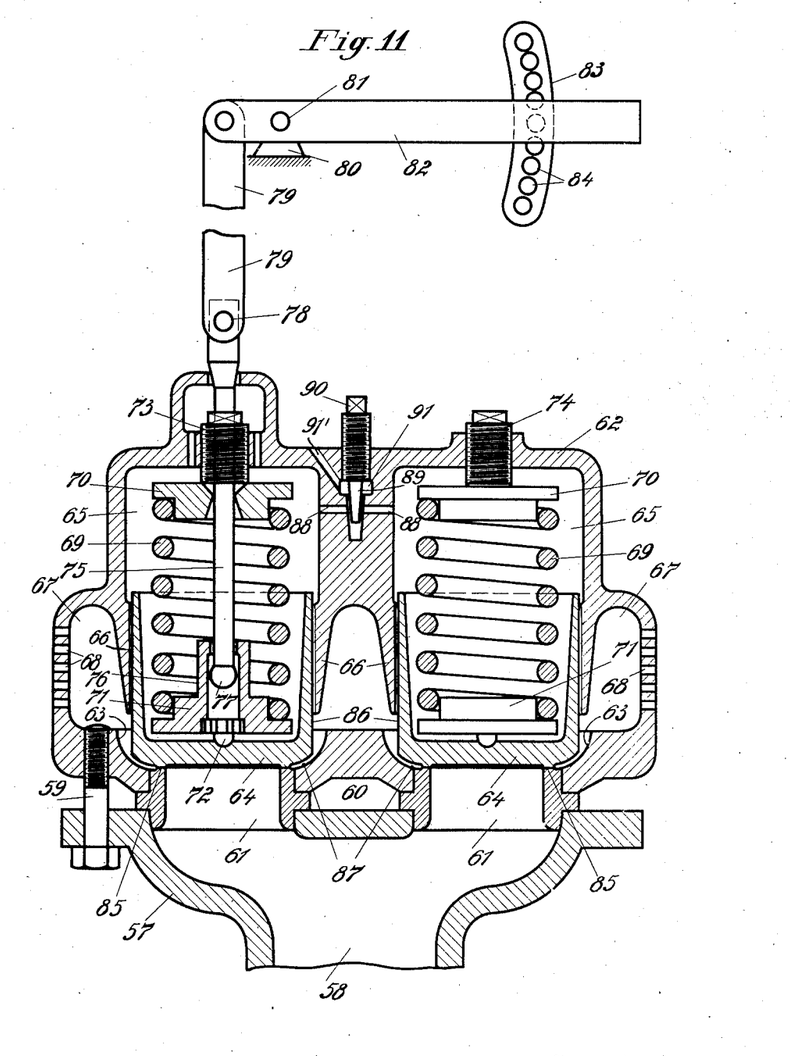
Fig. 11 is a vertical section of a compound valve comprising two or more single valves and means for lifting the valves by hand the arrangement being such that on only one valve being opened the remaining valve or valves will likewise be opened.

In Fig. 11 there is illustrated the application of the subject-matter of my invention to compound valves such as are required for locomotive boilers by the railway regulations of many countries. Now in the case of such valves it is extraordinarily difficult to reliably cause all the different valves to operate synchronously and to open at one and the same time. For in and for themselves, after one of these valves has been opened, the remaining valves have neither the tendency nor the occasion to likewise open up. Now this defect may be remedied in the case of the improved valves, as will be presently seen, by a very simple means.

In this form of construction 57 is the connecting branch of the boiler with the steam exhaust port 58 conjointly closed by the valves. The valve casing 62 is fixed to the said connecting branch 57 by means of screw bolts 59. Intermediate the said connecting branch and the valve casing there is inserted the annular valve seat 60 having, for example, two exhaust passages 61. For the purpose of regulating the lift in the sense required by my invention, there are arranged guide faces 63. The valves 64 are constructed each for itself after the manner of a cup.

The valve casing 62 is provided with a hollow chamber 65 for each valve 64, the lower part 66 of which embraces the cylindrical or, it may be, prism-shaped neck of the valve cup in the manner of a guide, closely though not quite steam-tight. When, after the valve has been raised, the steam is blown off, the possibility is thus provided of the necessary quantity of what is still high pressure steam passing through said guide elements into the hollow chambers 65 for the purpose of there exerting its action on the duration of the activity and the working of the valve. The lower part 66 of said hollow chambers 65 is surrounded on the outside by an annular space 67, which is in communication with the atmosphere through apertures 68. Coil springs 69 arranged within the buffer chamber 65 intermediate tensioning plates 70 and 71 serve to force the valves 64 down on their seats. The most advantageous adjustment of the valve bodies possible in order to secure a steam-tight closure at the valve seat is secured by the insertion of balls 72. By aid of set screws 73 and 74, adapted to pass through the roof of casing 62 from without, the springs 69 may be conveniently tensioned whenever required even during service.

The left-hand valve is provided with a pin 75 passed, loosely guided, through the bore of the upper tensioning plate 70 and the set screw 73, and projecting with its knob-shaped, strengthened end 77 into a hollow space appertaining to an extension 76 of the tensioning plate 71. With its upper end, this pin is suspended by means of a bolt 78 to the connecting rod 79 which, for its part, is articulated to the shorter arm of the two-armed lever 82 adapted to be operated from the engine driver's stand and rocking within a bearing 80 about a fulcrum 81. A plate 83 having a plurality of holes 84 for the reception of locking pins enables the lever 82 to be fixed in the different positions into which it has been rocked. In accordance therewith, the pin 75 either serves to limit the lift of the valve as it rises when unseated, or to permanently force the valve down on its seat or, lastly, to keep this particular valve and therewith also the other one permanently open.

This last-named result is achieved, while use is made of the annular space 67, by aid of clearances 87, formed by narrowly rounding off the edge of the valve body close to the seating and packing faces 85 appertaining to the valves and which are made as narrow as possible, and into which clearance on only a single valve being unseated the steam blowing off may enter through apertures 86. The lift action of this exhaust steam will then also serve to raise the valves which as yet have still remained shut. By this means the difficulty of causing any number of valves which have not been unseated to be raised is thus successfully overcome.

For the purpose of regulating the back pressure within the hollow chambers 65 of the individual valves, there is arranged a needle valve 89, 90, common to all the valves, and by the adjustment of which the concentrically disposed passages 88, 88 may be cut off more or less from the conduit or passage 91 which is in communication with the atmosphere through an opening 91'. By means of the said passages 88 there is moreover effected a balancing or equalizing of the steam pressure within the one chamber 65 relatively to the other. This is a feature which essentially contributes to secure a satisfactory braking, respectively, pressure action of the arrangement, which is moreover promoted by the fact that the steam outlet through passages 88 into the air of the atmosphere is narrower than the steam inlet through the clearance provided intermediate the valves 64 and their guide elements 66.

In opposition to the commonly known form of arrangement having an auxiliary device in the shape of a piston or auxiliary valve adapted to be operated by hand and serving to entrap the steam blowing off in order to render it available for exerting an increased re-seating action on the valve, the improved arrangement as hereinbefore described allows an automatic working involving a braking and pressure action after the manner of an hydraulic brake.

By displacing lever 82, the re-seating of the valves may be caused to depend, when the engine is at a stop, upon a large drop of pressure, say, of perhaps ¾ atm., whereas when the engine is running a very small drop of pressure—say, of about only $\frac{1}{10}$ atm.—may be set up. This obviously means a considerable reduction of the steam losses.

In the arrangement shown in Fig. 11, due attention has been paid to permit of this said displacement to be effected within very wide limits by the ample play provided in the direction of lift for the valve pin 75 within the hollow space arranged in the lower tensioning plate 71. By means of a collar disposed above the upper tensioning plate 70 and within the bore of the tensioning screw 73, the spring 69 may be tensioned to a considerable degree before the pin 75 in moving downwards comes to abut against the valve body, or rather, in this arrangement, against the bottom of the hollow space formed in the tensioning plate 71: in other words before it enters into the emergency closing position.

In the place of the unseating device actuated in this case by the lever 82, or also instead of the needle valve 89, 90 arranged contiguous to the buffer chamber 65, or finally in the place of both these devices, the steam piping herein above referred to already, and which has only a narrow section, may be transferred from the buffer chambers 65 (Fig. 11) or—in the case of a modified form of construction of my invention—from the respective steam chambers to the engine driver's stand and may there be provided with a needle valve or other adjustable steam stop or steam exhaust device, as circumstances may suggest.

I claim:

1. In a safety valve in combination, an outlet port, a substantially cup-shaped valve body, a cylinder closed at one end disposed above and surrounding the upper part of said body, a leak at the contact faces intermediate said body and said cylinder and another leak in the upper part of said cylinder, a valve seat and a guide member surrounding said valve seat, the inner wall of said guide member and which forms a guide surface, surrounding said valve body in such manner that the cross section of the outlet opened when the valve body is lifted, will in all heights of lift assumed by said valve body allow so much steam to escape that the pressure of the steam in excess of the back pressure exerted by said valve body will possess the like value at all heights of lift.

2. In a safety valve in combination, an outlet port, a substantially cup-shaped valve body, a cylinder closed at one end disposed above and surrounding the upper part of said body, a leak at the contact faces intermediate said body and said cylinder and another smaller leak in the upper part of said cylinder, a valve seat and a guide member surrounding said valve seat, the inner wall of said guide member and which forms a guide surface, surrounding said valve body in such manner that the cross section of the outlet opened when the valve body is lifted, will in all heights of lift assumed by said valve body allow so much steam to escape that the pressure of the steam in excess of the back pressure exerted by said valve body will possess the like value at all heights of lift.

3. In a safety valve in combination, an outlet port, a substantially cup-shaped valve body, a cylinder closed at one end disposed above and surrounding the upper part of said body, a leak at the contact faces intermediate said body and said cylinder and another leak in the upper part of said cylinder, means for regulating the steam pressure within said cylinder, a valve seat and a guide member surrounding said valve seat, the inner wall of said guide member and which forms a guide surface, surrounding said valve body in such manner that the cross section of the outlet opened when the valve body is lifted, will in all heights of lift assumed by said valve body allow so much steam to escape that the pressure of the steam in excess of the back pressure exerted by said valve body will possess the like value at all heights of lift.

4. In a safety valve, in combination, an outlet port, a movable valve body, a valve seat therefor surrounding said port, a cylinder surrounding a portion of said body and in which said body is movable, a leak between the contact faces of said body and cylinder, a second smaller leak at one end of said cylinder, and a guide member surrounding said valve seat and having a guide surface encircling said valve body in such manner that the cross section of the outlet opened when the valve body is lifted, will in all heights of lift assumed by said body allow so much steam to escape that the pressure of the steam in excess of the back pressure exerted by said valve body will possess the like value at all heights of lift.

5. In a safety valve, in combination, a movable valve body, a valve seat therefor, a cylinder combined with said valve body to form a chamber, there being steam inlet and outlet ports for said chamber, the latter port being above said valve body leading directly from the interior of said chamber into the atmosphere and smaller in cross area than that of the inlet port, and a guide member being increasingly spaced from said valve body from a point intermediate the valve seat and the lip of said guide member to said lip.

6. In a safety valve, a valve seat, a valve body movable from said seat by excessive pressure, a fixed cylinder forming a pressure chamber in combination with and at the upper side of said valve body, said pressure chamber being provided with inlet and outlet ports, said inlet ports being adapted to gradually admit only a portion of the steam under pressure from the seat underneath said valve body into said chamber when the valve body is lifted from its seat, said ports establishing immediate and permanent communications with said chamber during the periods of time when the valve body is lifted from its seat, and being so dimensioned that the steam admitted in the said chamber through said inlet ports is not immediately reduced in pressure but escapes gradually in such a way that there is produced in said chamber a pressure tending to force back the valve upon its seat.

7. In a safety valve, a valve seat, a valve body movable from said seat by excessive pressure, a fixed cylinder forming a pressure chamber in combination with and at the upper side of said valve body, said pressure chamber being provided with inlet and outlet ports, the latter port being above said valve body and communicating directly from the interior of said chamber to the atmosphere, said inlet ports being adapted to gradually admit only a portion of the steam under pressure from the seat underneath said valve body into said chamber when the valve body is lifted from its seat, means to permit the escape of the remaining portion of said steam without entering said chamber, said ports establishing immediate and permanent communications with said chamber during the periods of time when the valve body is lifted from its seat, and being so dimensioned that the steam admitted in the said chamber through said inlet ports is not immediately reduced in pressure but escapes gradually in such a way that there is produced in said chamber a pressure tending to force back the valve upon its seat, and means for regulating the cross section of said outlet port.

8. In a safety valve, a valve seat, a valve body movable from said seat by excessive pressure, a fixed cylinder forming a pressure chamber in combination with and at the upper side of said valve body, said pressure chamber being provided with inlet and outlet ports, said inlet ports being adapted to gradually admit only a portion of the steam under pressure from the seat underneath said valve body into said chamber when the valve body is lifted from its seat, an apertured member surrounding said cylinder to permit of the escape into the atmosphere of the remaining portion of said steam, said ports establishing immediate and permanent communications with said chamber during the periods of time when the valve body is lifted from its seat, and being so dimensioned that the steam admitted in the said chamber through said inlet ports is not immediately reduced in pressure but escapes gradually in such a way that there is produced in said chamber a pressure tending to force back the valve upon its seat, and resilient means engaging said valve body and aided by the pressure in said chamber to reset said body upon decrease of said excessive pressure.

9. In a safety valve, a valve seat, a valve body movable from said seat by excessive pressure, a fixed cylinder forming a pressure chamber in combination with and at the upper side of said valve body, said pressure chamber being provided with inlet and outlet ports, said inlet ports being adapted to gradually admit only a portion of the steam under pressure from the seat underneath said valve body into said chamber when the valve body is lifted from its seat, an apertured member surrounding said cylinder to permit of the escape into the atmosphere of the remaining portion of said steam, said ports establishing immediate and permanent communications with said chamber during the periods of time when the valve body is lifted from its seat, and being so dimensioned that the steam admitted in the said chamber through said inlet ports is not immediately reduced in pressure but escapes gradually in such a way that there is produced in said chamber a pressure tending to force back the valve upon its seat, and a spring arranged within said chamber and valve body and bearing against the latter and assisted by the pressure in said chamber to return the body to engagement with said valve seat upon decrease of said excessive pressure.

10. In a safety valve, a valve seat, a valve body movable from said seat by excessive pressure, a fixed cylinder forming a pressure chamber in combination with and at the upper side of said valve body, said pressure chamber being provided with inlet and outlet ports, said inlet ports being adapted to gradually admit only a portion of the steam under pressure from the seat underneath said valve body into said chamber when the valve body is lifted from its seat, an apertured member surrounding said cylinder to permit of the escape into the atmosphere of the remaining portion of said steam, said ports establishing immediate and permanent communications with said chamber during the periods of time when the valve body is lifted from its seat, and being so dimensioned that the steam admitted in the said chamber through said inlet ports is not immediately reduced in pressure but escapes gradually in such a way that there is produced in said chamber a pressure tending to force back the valve upon its seat, resilient means engaging said valve body and aided by the pressure in said chamber to reset said body upon decrease of said excessive pressure, and means for regulating the size of said outlet port.

11. In a safety valve, a valve seat, a valve body movable from said seat by excessive pressure, a cylinder surrounding said valve body in spaced relation and combining therewith to form a pressure chamber at the upper side of said body, said pressure chamber being provided with inlet and outlet ports, said inlet ports being adapted to gradually admit only a portion of the steam under pressure from the seat underneath said valve body into said chamber when the valve body is lifted from its seat, means to permit the escape of the remaining portion of said steam into the atmosphere, said ports establishing immediate and permanent communications with said chamber during the periods of time when the valve body is lifted from its seat, and being so dimensioned that the steam admitted in the said chamber through said inlet ports is not immediately reduced in pressure but escapes gradually in such a way that there is produced in said chamber a pressure tending to force back the valve upon its seat.

12. In a safety valve, an exhaust port, a valve body, a casing surrounding said valve body adapted to throttle exhaust steam, the inner surface of said throttle casing being formed in such a way that due to the configuration of the inlet cross-section available to the steam during the instantaneous positions of said valve body, said steam is throttled to such an extent that the total pressure exerted by the steam upon the lower side of the valve body constantly exceeds that pressure which tends to force back the valve upon its seat by a predetermined value, constant at any position of the valve.

In testimony whereof I affix my signature.

GOTTLIEB ACKERMANN.